US010622791B2

(12) United States Patent
Turnbull (10) Patent No.: US 10,622,791 B2
(45) Date of Patent: Apr. 14, 2020

(54) FIELD-MOUNTABLE WINCH ASSEMBLY

(71) Applicant: Altec Industries, Inc., Birmingham, AL (US)

(72) Inventor: Jason P. Turnbull, Weston, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 15/869,840

(22) Filed: Jan. 12, 2018

(65) Prior Publication Data

US 2019/0222004 A1    Jul. 18, 2019

(51) Int. Cl.
| | |
|---|---|
| *H02G 7/05* | (2006.01) |
| *H02G 1/04* | (2006.01) |
| *B60P 1/54* | (2006.01) |
| *H02G 1/08* | (2006.01) |
| *E04H 12/24* | (2006.01) |

(52) U.S. Cl.
CPC .............. *H02G 1/04* (2013.01); *H02G 7/05* (2013.01); *B60P 1/5433* (2013.01); *B60P 1/5471* (2013.01); *E04H 12/24* (2013.01); *H02G 1/085* (2013.01)

(58) Field of Classification Search
CPC ............ H02G 1/08; H02G 1/085; H02G 1/04; H02G 1/02; H02G 7/05; B66F 11/044; B66D 1/36; F16M 13/022
USPC ........................ 254/134.3 FT, 134.3 R; 269/6
See application file for complete search history.

(56) References Cited

U.S. PATENT DOCUMENTS

| | | | | |
|---|---|---|---|---|
| 1,547,915 | A * | 7/1925 | Hirn ...................... | B66C 23/203 52/40 |
| 4,050,587 | A * | 9/1977 | Moen ...................... | B66C 23/48 212/301 |
| 4,582,206 | A * | 4/1986 | Johnson ................ | B66F 11/046 182/2.9 |
| 5,538,207 | A * | 7/1996 | O'Connell ............... | H02G 1/04 182/2.11 |
| 7,357,263 | B2 * | 4/2008 | Player ..................... | B66C 23/66 212/238 |
| 8,573,562 | B2 * | 11/2013 | Devine ................... | B66C 23/66 254/134 |
| 8,714,525 | B2 * | 5/2014 | Lessard .................... | H02G 1/04 254/134.3 PA |
| 9,739,070 | B2 * | 8/2017 | Bushore .................. | E02D 27/42 |
| 9,899,811 | B2 * | 2/2018 | Smith ...................... | H02G 1/08 |
| 2004/0140602 | A1 * | 7/2004 | Gerritsen ................ | B25B 5/068 269/6 |

(Continued)

OTHER PUBLICATIONS

Christ, Robert D. Wernli, Robert L. Sr. (2014). ROV Manual—A User Guide for Remotely Operated Vehicles (2nd Edition)—9.2.1 Winches. Elsevier. Retrieved from https://app.knovel.com/hotlink/pdf/id:kt00UBN6K8/rov-manual-user-guide/winches (Year: 2014).*

*Primary Examiner* — Monica S Carter
*Assistant Examiner* — Mahdi H Nejad
(74) *Attorney, Agent, or Firm* — Erise IP, P.A.

(57) ABSTRACT

A field-mountable winch assembly comprising a boom, boom mount, motor, drum, rollers for supporting a line, base, rotating drum and a clamp is disclosed. The field-mountable winch assembly may rotate a drum pulling a line over rollers raising a power line to be attached to a utility pole. The winch may be clamped to the crossbeam of the utility pole freeing a utility platform of the tools necessary to raise the power line.

20 Claims, 4 Drawing Sheets

(56) References Cited

U.S. PATENT DOCUMENTS

| | | | |
|---|---|---|---|
| 2007/0221599 A1* | 9/2007 | Player | B66C 23/66 |
| | | | 212/179 |
| 2009/0078921 A1* | 3/2009 | Plummer | H02G 1/08 |
| | | | 254/134.3 FT |
| 2011/0221110 A1* | 9/2011 | Ranieri | B25B 5/04 |
| | | | 269/6 |
| 2015/0184415 A1* | 7/2015 | Bushore | E02D 27/42 |
| | | | 52/831 |
| 2017/0247236 A1* | 8/2017 | Svoboda | A62B 35/0068 |

* cited by examiner

FIELD-MOUNTABLE WINCH ASSEMBLY

BACKGROUND

1. Field

Embodiments of the invention are broadly directed to raising electric power lines or phase lines onto utility poles. More specifically embodiments of the invention relate to a winch for mounting on a utility pole crossbeam and raising electric power lines or phase lines.

2. Related Art

Typically, power lines, or phase lines are lifted into position on utility poles using a utility vehicle with a boom and a jib. A utility vehicle uses a boom with a utility platform and jib attached. A line is run through the jib and extends down to the ground. Power lines are attached to the line and the line is drawn through the jib raising the power lines to the workers in the utility platform. The workers then attach the power lines to attachments on the utility poles.

There are problems associated with the typical systems of the prior art. Often loads are estimated by the workers in the field with little information and under unknown conditions. The loads may be different than expected. The dynamic loads based on the movement of the load may be unknown. Under these circumstances, it is common for the jibs to get bent or damaged. The jib also increases the load on the boom. The boom may be placed in unusual configurations to avoid trees or other obstacles. The unusual configurations with the added weight of the jib and the load further creates unknown loads on the boom and utility vehicle. The jib and jib attachment to the utility platform also reduces space for the workers. What is needed is a device that allows the boom to be free of the weight of the jib and allows more room in the utility platform for more workers.

SUMMARY

Embodiments of the invention solve these problems by providing a field-mountable winch assembly that may mount to the crossbeam of a utility pole assembly. The field-mountable winch assembly may be raised in the utility platform by the boom attached to the utility vehicle and attached to the crossbeam or vertical beam of the utility platform. Once attached to the crossbeam of the utility pole assembly the utility platform is free of the field-mountable winch assembly. The utility platform may pick up extra workers and there is no load added from a jib or from the power lines. The load is added to the utility pole assembly freeing the workers and the utility vehicle to maneuver freely without the extra load of the jib and the power lines. The load is further reduced by transferring the dynamic load to the utility pole.

A first embodiment is directed to a field-mountable winch assembly comprising a boom, boom roller, boom mount, drum, motor, base, support drum, and a clamp. The boom mount is configured to support the boom. The boom roller is configured to support a line. The motor is configured to rotate the drum and the drum is configured to rotate and wrap the line. The base is configured to support at least the boom mount and the motor and is supported by the support drum. The clamp is configured to support the support drum and clamps a beam.

A second embodiment is directed to a field-mountable winch assembly comprising a boom, boom mount, boom roller, mount roller, drum, motor, base, support drum, and a clamp assembly. The boom mount is configured to support the boom. The boom roller is configured to attach to the boom. The mount roller is configured to attach to the boom mount. The boom roller and mount roller are configured to support a line. The motor is configured to rotate the drum which is configured to rotate and wrap the line. The base is configured to support at least the boom mount and motor. The support drum is configured to support the base. The clamp assembly comprises an upper clamp portion and a lower clamp portion. The upper clamp portion is configured to support the support drum and the upper clamp portion and the lower clamp portion are configured to clamp onto a beam.

A third embodiment is directed to a field-mountable winch assembly comprising a boom, boom mount, boom roller, drum, motor, base, support drum, and clamp. The boom mount is configured to support the boom. The boom roller is configured to attach to the boom. The boom roller is configured to support a line. The motor is configured to rotate the drum and the drum is configured to rotate and wrap the line. The base is configured to support at least the boom mount and the motor. The support drum is configured to support the base. The clamp is configured to support the support drum and clamp a beam between an upper clamp portion and a lower clamp portion.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF DRAWINGS

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1:
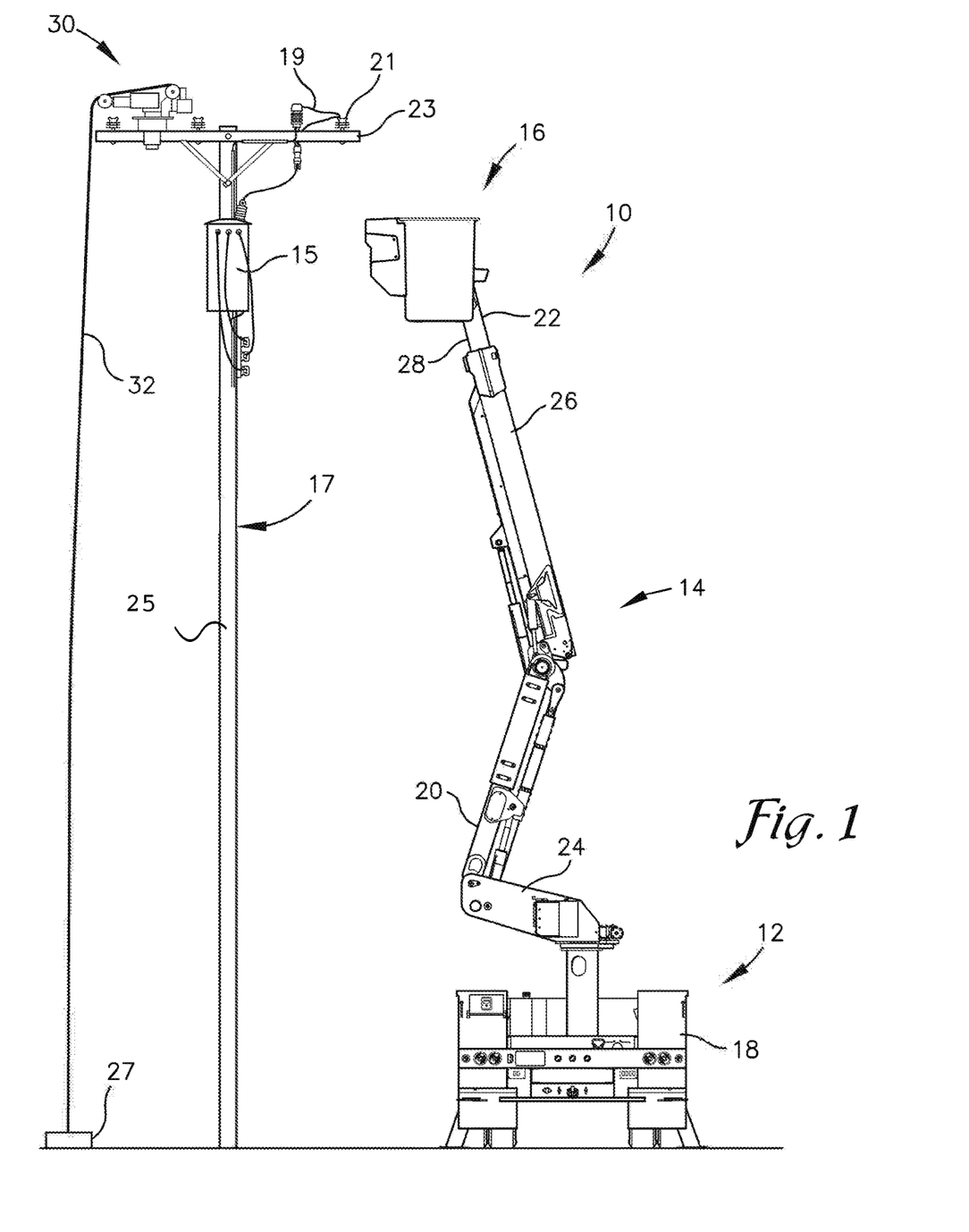
FIG. 1 depicts a rear view of an aerial device in embodiments of the invention.

An aerial device 10, constructed in accordance with various embodiments of the invention, is shown in FIG. 1. The aerial device 10 generally comprises a structural base 12 with a boom assembly 14 rotatably mounted thereto. A utility platform assembly 16 is disposed on the boom assembly 14 to provide the utility platform assembly 16 for the accomplishment of a task by a utility worker. A jib winch (not shown) may be attached to the utility platform assembly. In embodiments of the invention, boom and platform controls may be disposed in the utility platform assembly 16 for controlling the boom assembly 14 and the utility platform assembly 16. The aerial device 10 may be controlled to allow a user access to a utility pole assembly 17.

The utility pole assembly 17 may comprise a transformer 15, electric lines 19, insulator 21, crossbeam 23, and vertical pole 25. The vertical pole 25 may support all other components. The crossbeam 23 may be attached to the pole and run laterally supporting the electric lines 19 and insulator 21. The crossbeam 23 may also support any power lines, connectors, transformers, or any equipment necessary.

The structural base 12 of the aerial device 10 is a selectively stabilized platform. In embodiments of the invention, the structural base 12 may be a utility truck 18 (as illustrated in FIG. 1), a crane base, an oilrig, an earth-working machine, or a fixed structure. The structural base 12 provides stability and a counterweight to a load being supported by the boom assembly 14. The structural base 12 also provides a hydraulic power system, pneumatic power system, electrical power system, or other system (not illustrated) that powers the movement of the utility platform assembly 16, and may provide power to other tools or components.

The boom assembly 14 broadly comprises an outer boom section 26 and at least one inner boom section 28. The boom assembly 14 presents a proximal end 20 and a distal end 22. The proximal end 20 is rotatably and/or pivotably secured to a boom turret 24 of the structural base 12. The at least one inner boom section 28 is at least in part disposed within the outer boom section 26. The at least one inner boom section 28 telescopes to extend or retract into the outer boom section 26 assembly. In embodiments, there may be no outer boom section 26 and inner boom section 28 and the boom assembly 14 may not telescope. The boom assembly 14 may be one piece or multiple pieces comprising one or multiple booms. All boom operations as well as some structural base operations may be operated by controls disposed in the utility platform assembly 16 or in or on any portion of the aerial device 10.

The field-mountable winch assembly 30 may be placed in or attached to the utility platform assembly 16. The utility platform assembly 16 may be raised to the crossbeam 23 by the aerial device 10 boom assembly 14. The user controlling the boom assembly 14 may be in the utility platform assembly 16, on the ground, or in the utility truck 18. The boom assembly 14 may be controlled from any control device on the aerial device 10 or from a remote control.

After the utility platform assembly 16 has been raised to a height that allows the workers in the utility platform assembly 16 to access the crossbeam 23, the field-mountable winch assembly 30 may be configured to mount on the crossbeam 23. This may be performed manually be the workers in the utility platform assembly 16 or by a machine or tool specifically designed to move the field-mountable winch assembly 30 and attach the field-mountable winch assembly 30 to the crossbeam 23. The field-mountable winch assembly 30 may be designed specifically for one worker, two workers, or any number of workers that may be necessary to move the field-mountable winch assembly 30. The field-mountable winch assembly 30 may comprise handles, hooks, straps, or any other device that may aid in maneuvering the field-mountable winch assembly 30. The field-mountable winch assembly 30 may be attached to the utility platform assembly 16 and be placed in position using the boom assembly 14 such that the workers do not manually move the field-mountable winch assembly 30. The workers may only attach or cinch a clamp to secure the field-mountable winch assembly 30 to the crossbeam 23. In embodiments, the field-mountable winch assembly 30 may be raised into position on the crossbeam 23 or vertical beam 25 by a helicopter, ladder, jib winch attached to the utility platform, or any other method or tool that may raise the field-mountable winch assembly 30.

The field-mountable winch assembly 30 may attach to the crossbeam 23 of the power pole assembly 17. The field-mountable winch assembly 30 may fit around the crossbeam 23 or slide over the end and clamp down. The field-mountable winch assembly 30 may be held in place by clamping around the crossbeam 23. The clamp surface may be covered in a material useful to prevent slipping on the crossbeam 23 as the crossbeam 23 may be made of steel, aluminum, wood, composite, or other materials. The materials used to prevent slipping may be concordant with the material of the crossbeam 23. For example, the clamp may be cover on at least one side or be configured with teeth, rough sand paper material, polymer, rubber, grooves, spikes, or any other material, petroleum based material, or configuration that may aid in reducing slippage of the field-mountable winch assembly 30 on wood, metal, plastic, or any other material of which the crossbeam 23 may be made.

Attaching the field-mountable winch assembly 30 as close to the vertical pole 25 of the utility pole assembly 17 as possible may aid in reducing stress in the utility pole assembly 17. The vertical pole 25 provides support to the structure. The further the assembly is from the vertical pole 25 the greater the moment the field-mountable winch assembly 30 creates adding stress to the vertical pole 25. The crossbeam 23 is also attached to the vertical pole 25. The further the field-mountable winch assembly 30 is from the vertical pole 25 the greater the moment acting on the crossbeam 23 which creates more stress on the crossbeam 23 and the attachment between the crossbeam 23 and the vertical pole 25.

The field-mountable winch assembly 30 may be attached to the vertical pole 25. Attaching the field-mountable winch assembly 30 to the vertical pole 25 may place all stress on the vertical pole 25 and allow all objects comprising the pole assembly 17 to be raised using the field-mountable winch assembly 30. The objects may be raised as one assembly or individually. For example, any component such as the insulator 21 or power lines may be raised, or the power lines, the insulator 21, and the crossbeam 23 may be raised together.

The field-mountable winch assembly 30 may then be adjusted such that a line 32 (which may be a rope) may extend from the field-mountable winch assembly 30 to the ground while remaining clear of the utility pole assembly 17. The extended line 32 may then be attached to a power line (which may be load 27) to be raised onto the utility pole assembly 17. Once a power line is attached to the line 32, the line 32 and the power line may be winched up to a height that allows the workers in the utility platform assembly 16 to access the power line. The power line may then be mounted on the insulators 21 or the offsets of the pole assembly 17.

Placing the field-mountable winch assembly 30 on the utility pole assembly 17 as shown in FIG. 1, may allow the utility platform assembly 16 to be clear of any device used to raise the power lines such as a jib. The boom assembly 14 may then be free of the forces associated with a jib and power lines as well as any dynamic forces associated with raising the power lines. The utility platform assembly 16 may also be clear of any obstructions and may allow for enough space to increase the number of workers in the utility platform assembly 16.

For example, the field-mountable winch assembly 30 may be used to raise and lower the transformer 15, insulator 21, three phase power lines, or any other device or tool that may be used on the pole assembly 17. Similarly, the field-mountable winch assembly 30 may be used to attach to a tree branch, pole, rod, truck, car, or any vehicle that may support the load 27 and be used to tow any load 27 such as power lines, vehicle, pull tree stumps, raise lumber, or any other utilization that a field-mountable winch assembly 30 may be used for.

Figure 2:
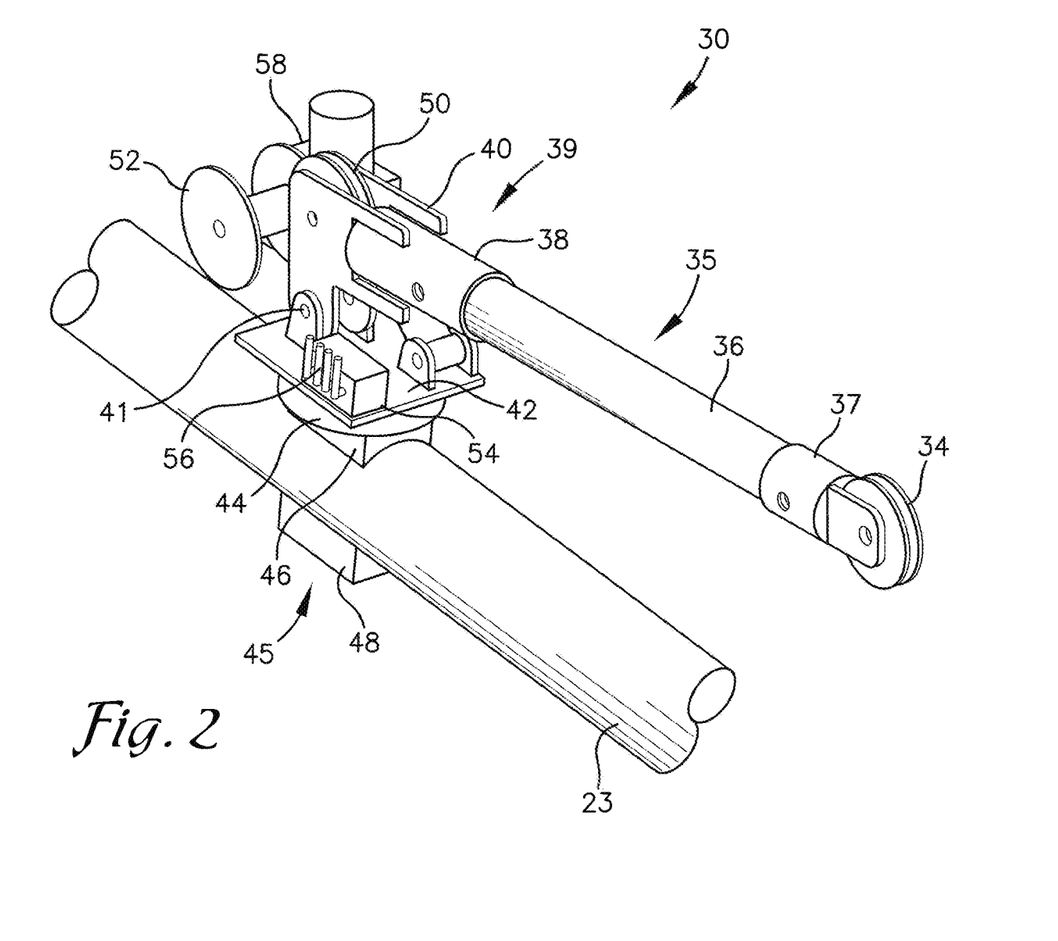
FIG. 2 depicts a perspective view of a field-mountable winch assembly.

An exemplary embodiment of the field-mountable winch assembly 30 is depicted in FIG. 2. The field-mountable winch assembly 30 may have a boom roller 34 attached to an inner boom 36 at a distal end 37. The inner boom 36 may telescope from a proximal end 39 within the outer boom 38. The winch boom assembly 35 may be comprised of inner boom 36 and outer boom 38. The inner boom 36 and the outer boom 38 are exemplary and may be switched such that the boom roller 34 is attached to the outer boom 38 and the outer boom 38 extends from the inner boom 36. The outer boom 38 may be attached at a proximal end to the boom mount 40 which may be attached to base 42. The boom mount 40 may be pivotable at a pivot point 41. The base 42 may support all components above the base 42. The base 42 may be supported by a laterally rotating drum 44. The laterally rotating drum 44 may be mounted on an upper clamp portion 46 that may be attached to a lower clamp portion 48 of the clamp assembly 45 and may rotate about a vertical axis. The upper clamp portion 46 may be attached to the lower clamp portion 48 and pulled together tightly around the crossbeam 23. A mount roller 50 may be attached to the base 42 or the boom mount 40. Drum 52 may rotate and may be attached to the boom mount 40 or the base 42. Controller housing 54 may be mounted to the base 42 and house the controls 56 for operating the rotational and translational devices of the crossbeam 23 field-mountable winch assembly 30 or a motor 58 or motors and any electric, hydraulic, pneumatic, or any other systems that may be used by the field-mountable winch assembly 30. The components supported by the base 42 may at least be boom roller 34, winch winch boom assembly 35, boom mount 40, mount roller 50, drum 52, controller housing 54, controls 56, motor 58, and any other components that may be used on the field-mountable winch assembly 30.

In embodiments of the invention as depicted in FIG. 2, the field-mountable winch assembly 30 and at least one worker may be raised in the utility platform assembly 16 to a height sufficient to access the crossbeam 23 of the utility pole assembly 17. The workers may manually place the field-mountable winch assembly 30 on the crossbeam 23 or slide the field-mountable winch assembly 30 over the end of the crossbeam 23. A powered tool or mechanical tool may also be used to assist the workers in moving the field-mountable winch assembly 30. The field-mountable winch assembly 30 may be attached to the utility platform assembly 16 and raised to specific location relative to the crossbeam 23 such that the workers do not have to move the field-mountable winch assembly 30. The field-mountable winch assembly 30 may be intermittently attached to the crossbeam 23 then detached from the utility platform assembly 16 while placing the field-mountable winch assembly 30 in the proper position. The field-mountable winch assembly 30 may be configured with handles, straps, ropes, pulleys, or any other device that may assist in maneuvering the field-mountable winch assembly 30 and attaching the field-mountable winch assembly 30 to the utility platform assembly 16 and the crossbeam 23.

The field-mountable winch assembly 30 may be placed on the crossbeam 23 and secured with the clamp assembly 45. The clamp assembly 45 may slide around the crossbeam 23 or the lower clamp portion 48 may be separated from the upper clamp portion 46 allowing the field-mountable winch assembly 30 to be placed on the crossbeam 23. Alternatively, the lower clamp portion 48 may be separated from the upper clamp portion 46 on one side and hinged or slid into place before attaching the separated side. Further, the lower clamp portion 48 may be wrapped around or be placed under the crossbeam 23 and may be tightened, squeezing the crossbeam 23 using friction to secure the field-mountable winch assembly 30 to the crossbeam 23. The clamp assembly 45 may be a C-clamp with a hinge and cinched down to tighten, or may be two separated parts that are held together or cinched down using bolts such as in a universal clamp, and the attachments may be tie downs, rope, wire, cable, loop and hook attachment, bolts, or any other method that may squeeze the upper clamp portion 46 and the lower clamp portion 48 together providing enough friction to secure the field-mountable winch assembly 30 to the crossbeam 23.

The interior surface of the upper clamp portion 46 and the lower clamp portion 48 may be configured or covered in a material that may reduce the likelihood of the field-mountable winch assembly 30 to slip on the crossbeam 23. The interior surface of the upper clamp portion 46 and the lower clamp portion 48 may be configured with teeth, rough sand paper material, rubber, grooves, spikes, polymer, or any other material or configuration that may aid in reducing slippage of the field-mountable winch assembly 30 on wood, metal, plastic, or any other material of which the crossbeam 23 may be made. The material interaction between the clamp assembly 45 and the crossbeam 23 as applied with a clamping force may provide a friction force great enough to overcome any forces created in normal use of the field-mountable winch assembly 30. These forces due to normal use may be static or dynamic and may be caused by the workers, field-mountable winch assembly 30, power lines, gravity, or environmental conditions.

In embodiments, the field-mountable winch assembly 30 may been secured to the crossbeam 23 near the vertical pole 25 as to reduce the moment stress in the utility pole assembly 17 as discussed above. The field-mountable winch assembly 30 may further be secured to the vertical pole 25. The field-mountable winch assembly 30 may be secured with a clamp as secured to the crossbeam 23 or may be secured with straps, tethers, rope, or any other method. Securing to the vertical pole 25 may be for redundant stability or may provide a backup line in case the field-mountable winch assembly 30 slips on the crossbeam 23.

After the field-mountable winch assembly 30 has be secured to the crossbeam 23, the workers and the utility platform assembly 16 may be free to move without the space and weight restrictions of the field-mountable winch assembly 30, jib, or any other device or tool that may be used in lifting power lines. The utility platform assembly 16 may be lowered and more workers may be added to the utility platform assembly 16. Fewer workers may also be used to raise the power lines. Since the field-mountable winch assembly 30 is stationary on the crossbeam 23, the workers that placed the field-mountable winch assembly 30 may be lowered to the ground and connect the power lines to be raised then raise the utility platform assembly 16 and operate the field-mountable winch assembly 30 to raise the power lines.

In the exemplary embodiment depicted in FIG. 2, a rope (which may be line 32) may be strung over the boom roller 34 and mount roller 50 and attached to the drum 52. The boom roller 34 and the mount roller 50 may rotate freely with little resistance. The drum 52 may be operated by the motor 58 controlled by an operator using the controls 56. The drum 52 may rotate pulling the rope over the boom roller 34 and the mount roller 50 raising the rope from the ground. The rope may be attached to the power lines to be mounted on the pole assembly 17.

Placing the winch near the vertical pole 25 may create obstacles that must be overcome. For example, as depicted in the embodiment in FIG. 2, the field-mountable winch assembly 30 may be placed on top of the crossbeam 23 such that the boom roller 34 is positioned above the crossbeam 23. Since the rope attached to the power line to be mounted extends vertically from the boom roller 34, the crossbeam 23 may be in the way. The field-mountable winch assembly 30 may be configured to rotate to allow the rope to be raised by the side of the crossbeam 23 or the winch boom assembly 35 may be extended to allow the rope to be raised over the end of the crossbeam 23. The inner boom 36 may be extended telescopically from the outer boom 38 allowing the boom roller 34 to extend beyond the end of the crossbeam 23.

In embodiments, an alternative or additive method for positioning the boom roller 34 in a location adequate for raising the power line may be rotating the winch boom assembly 35 to raise the power line on the side of the crossbeam 23. The directional rotating drum may rotate the base 42 and all objects mounted on the base 42 such that the boom roller 34 is clear of any obstructions in raising the power lines. The power line may be raised on the side then the winch boom assembly 35 extended to place the power line on the insulator 21 at the far edge of the crossbeam 23. This method may reduce the dynamic load on the pole assembly by raising the power line close to the vertical pole 25. The directional rotation and boom extension may be controlled by the controls 56 or may be manual. The laterally rotating drum 44 may have an electrical or mechanical locking mechanism to lock the field-mountable winch assembly 30 in place during use or storage.

Raising the power line next to the crossbeam 23 may create added stress on the crossbeam 23. This added stress may act in the form of torque. Torque may increase the likelihood of slippage between the field-mountable winch assembly 30 and the crossbeam 23. The added torque may be overcome with a counterweight (not illustrated) or the field-mountable winch assembly 30 may be weighted such that the weight of the winch boom assembly 35, the weight of the power line, and the dynamic force of raising the power line may be counteracted by the weight of the field-mountable winch assembly 30.

Rotating the winch boom assembly 35 about the directional rotating drum and positioning the boom roller 34 to the side of the crossbeam 23 may reduce the stress in the crossbeam 23 created by a moment. In the exemplary scenario in which the inner boom 36 is telescopically translated over the edge of the crossbeam 23, increased stress may be created due to the center of gravity moving further from the vertical pole 25 thus creating a moment load. When the winch boom assembly 35 is rotated to the side this additional load is not created, only the torque load may be created. The load due to moment vs torque may be weighed to determine the lower stress method that should be employed based at least in part on the pole assembly, and the load.

Weather conditions may also play a factor. If the crossbeam 23 is a condition may be created where applying a torque load is not feasible and only the boom extension and moment load may be applied. Windy conditions may also cause the power line to swing to the side creating dynamic loads on the crossbeam 23 and the field-mountable winch assembly 30. The clamp and crossbeam 23 interaction may take this sort of dynamic loading into account thus providing an attachment secure enough to overcome these loads.

Figure 3:
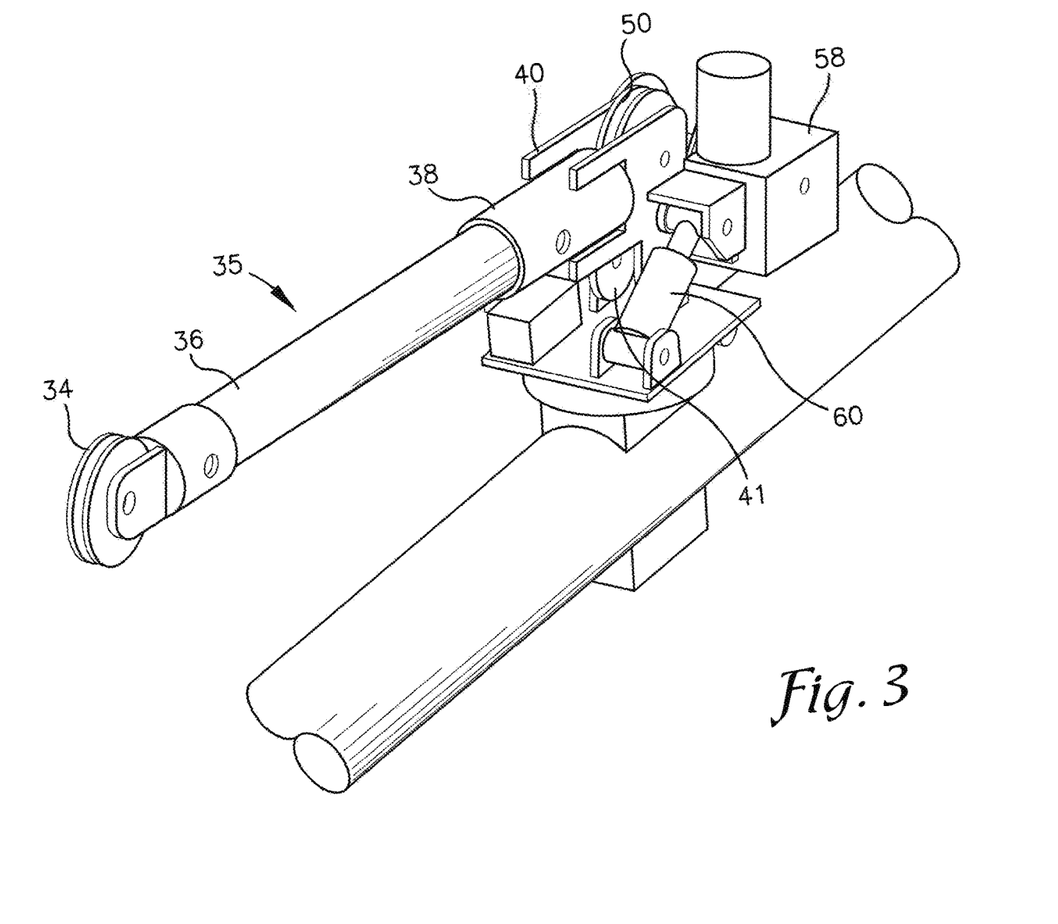
FIG. 3 depicts a perspective view of the field-mountable winch assembly of FIG. 2.

FIG. 3 presents a perspective view of the right side of an exemplary embodiment. The boom mount 40 may connect to and support the winch boom assembly 35 at the outer boom 38. The boom mount 40 and mount roller 50 may also be supported by the boom mount 40. The boom mount 40 may rotate about a pivot point 41 controlled by a piston 60 best seen in FIG. 3. As the boom mount 40 rotates the outer boom 38, inner boom 36, and mount roller 50 rotate together. The boom mount 40 rotation may be controlled by the controls 56 via the piston 60 or manually if, in embodiments, a piston 60 is not used. The boom mount 40 may lock into place using mechanical, hydraulic, electric, or electromechanical locks (not illustrated). The boom mount 40 may lock during use or storage. The mount roller 50, boom roller 34, piston 60, and boom mount 40 may lock individually or in any combination.

The base 42 may be configured to support the boom mount 40 and all components supported by the boom mount 40 as described above. The base 42 may also be configured to support the controller housing 54 containing the controls 56, the motor 58, the piston 60, all parts or components associated with each of the stated field-mountable winch assembly 30 components, and the weight of the transformer 15 or power lines to be raised. The base 42 may be the main structural support for the field-mountable winch assembly 30 and provide the base 42 for all components above the base 42 to rotate directionally on the laterally rotating drum 44 about a vertical axis.

Continuing with the embodiment depicted in FIG. 3 presenting a right-side perspective view of the exemplary field-mountable winch assembly 30. The field-mountable winch assembly 30 of FIG. 3 clearly depicts the piston 60 and motor 58. The piston 60 may be connected to and supported by the base 42 at one end and connected to and may at least partially support the boom mount 40. The piston 60 may be controlled using the control inputs and may extend and contract. The expansion and contraction may rotate the boom mount 40. The rotation of the boom mount 40 controlled by the piston 60 may be along a perpendicular axis relative to the crossbeam 23. This may cause a vertical rotation of the boom. Though the axis of rotation of the boom mount 40 is transverse and the rotation is vertical in the embodiment depicted in FIG. 3, the axis may be vertical, parallel, or any other direction. The embodiment in FIG. 3 is exemplary only. The piston 60 may be a motor, and may be electric, hydraulic, or pneumatic and may have an independent power source or may derive power from another system source such as the motor 58, the control system, or the aerial device 10.

The controller housing 54 may be mounted on the base 42 and may house the controls 56. The controls 56 may include a user input and/or a receiver for remotely operated control inputs. The controller housing 54 may have switches, buttons, knobs, joysticks, or any other control input that may be useful in operating the field-mountable winch assembly 30. The control inputs and the controller housing 54 may be electrically insulating. Any parts or components of the field-mountable winch assembly 30 may be configured to provide insulation from electrical shock by material use or providing separation from the user and the conductive components. The separation may create a shock gap that reduces the likelihood of electric shock.

The embodiment depicted in FIG. 3 displays the motor 58. The motor 58 may be electric or gas powered. The motor 58 as depicted in FIG. 3 may be, or receive power from, a power source such as solar, wind, battery, gas, from the aerial device, or other systems on the aerial device, the utility platform assembly 16, or other systems on the field-mountable winch assembly 30 and generate or transform power. The motor 58 may provide power to all systems on the field-mountable winch assembly 30 or may only provide power to individual systems such as the control system, piston 60, drum 52, or any electric, hydraulic, pneumatic, or electromechanical system and in any combination. In embodiments, there may be no motor 58 and the power may be drawn entirely from the aerial device.

Laterally rotating drum 44, as described above and depicted in the embodiment in FIG. 4, may provide rotational capabilities to the base 42 and components supported by the base 42. The laterally rotating drum 44 may be electrically, hydraulically, or mechanically controlled by the controls 56 or manually by the workers. The laterally rotating drum 44 may be locked in place by an electric lock, mechanical lock, or hydraulic lock. The laterally rotating drum 44 may rotate about a vertical axis pointing the winch boom assembly 35 in a direction and location to raise the power line. The laterally rotating drum 44 is exemplary only and may only be a support drum and be used for support of the base. The laterally rotating drum may be a support drum and not rotate.

Figure 4:
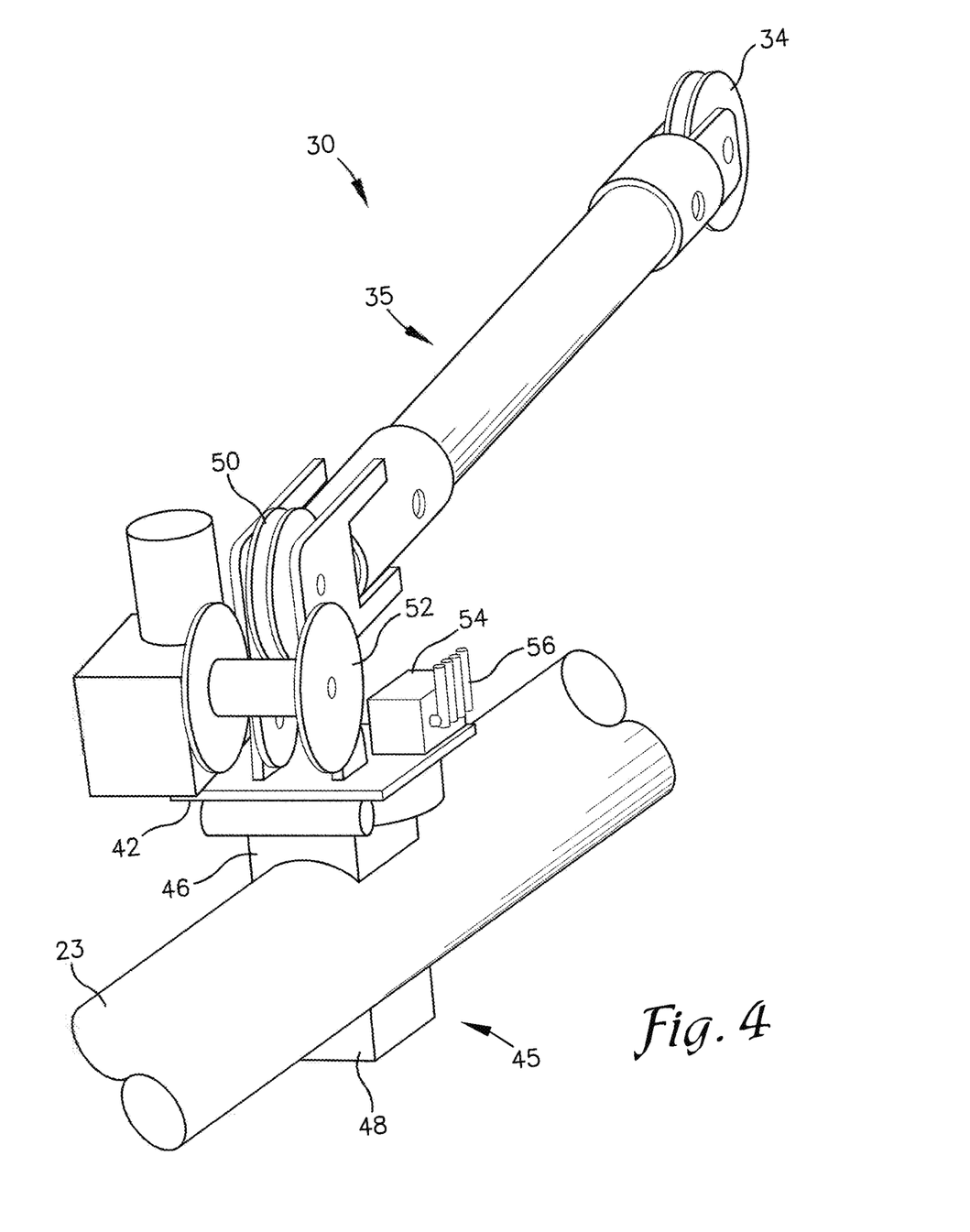
FIG. 4 depicts a perspective view from the rear of the field-mountable winch assembly of FIG. 2.

The laterally rotating drum 44 may be supported by the clamp assembly 45. The laterally rotating drum 44 may rest directly on the upper clamp portion 46. The upper clamp portion 46 may be configured to the shape of the crossbeam 23 to increase the in-contact surface area between the upper clamp portion 46 and the crossbeam 23. The lower clamp portion 48 may be configured in the same manner increasing the in-contact surface area between the lower clamp portion 48 and the crossbeam 23. The in-contact surface area may be further increased by the texture of the upper clamp portion 46 and lower clamp portion 48 surface in contact with the crossbeam 23. The interior surface of the upper clamp portion 46 and the lower clamp portion 48 may be configured with protrusions, grooves, and craters such as teeth, rough sand paper material, spikes, dimples, or material such as rubber, polymer, or any other material or texture that may aid in reducing slippage of the field-mountable winch assembly 30 on wood, metal, plastic, or any other material of which the crossbeam 23 may be made. Inserts or shims of any of the above stated textures or materials may also be added between the clamp assembly 45 and the crossbeam 23. The clamp assembly 45 may be a universal clamp as described above or a C-clamp, web clamp, mitre clamp, screw clamp, or any other type of clamp that may secure the field-mountable winch assembly 30 to the crossbeam 23.

In embodiments, the clamp assembly 45 may be dictated by the crossbeam 23. The crossbeam 23 cross-section may be round, oval, or polygon. The clamp assembly 45 may be configured to sufficiently attach to any of the above stated cross-sections. The crossbeam 23 may also be made of wood, metal, composite, or any other material that may be suitable to support power lines. The clamp assembly 45 upper clamp portion 46 and lower clamp portion 48 in-contact surfaces may provide material or texture to sufficiently maintain enough friction force to secure the field-mountable winch assembly 30 to the crossbeam 23.

The exemplary embodiment depicted in FIGS. 3 and 4 shows a drum 52. The drum 52 may be powered by the motor 58, the aerial device, or any other power source or system including electric, hydraulic, and pneumatic as described above. The drum 52 may anchor the rope extended over the mount roller 50 and the boom roller 34 used to raise the power lines. The drum 52 may be configured to rotate while winding the rope around a center portion that may have a smaller diameter than the outer edges. This configuration allows the drum 52 to wind the rope and raise the power line that may be attached to the end of the rope.

The laterally rotating drum 44, piston 60, and inner boom 36 telescopic extension provides the field-mountable winch assembly 30 with three degrees of freedom. First, the inner boom 36 may extend from the outer boom 38 as described above. The extension allows the boom roller 34 to reach the end of the crossbeam 23 and raise the power line over the end of the crossbeam 23 or reach the outer insulator 21 while still mounting the field-mountable winch assembly 30 close to the vertical pole 25. Second, the directional rotation provided by the laterally rotating drum 44 provides the capability to raise the power line next to the crossbeam 23 thereby reducing the moment load on the field-mountable winch assembly 30 and the crossbeam 23 as in the first degree of freedom stated above. The laterally rotating drum 44 may then rotate the power line over the crossbeam 23 for attachment. Third, the vertical rotation provided by the piston 60 allows the winch to easily place the power line on the insulator 21 and avoid obstructions. The maneuverability may put less of a strain on the workers and insure that the power lines be placed in the proper position with ease.

Material for all components may be determined by the function of the component and the load that may be raised by the field-mountable winch assembly 30. For example, the material used for the base 42 may be different than the material used to mount the motor 58. The motor 58 is a relatively light component that does not support the load therefore may require small structure. The motor 58 may be supported by steel, aluminum, plastic, or composite and may be connected using vibration dampers. Alternatively, the base 42 supports the majority of the components of the field-mountable winch assembly 30 and the load. The base 42 may be made of steel, aluminum, plastic, or composite, and may be more robust than a motor 58 mount.

The field-mountable winch assembly 30 may be optimized for weight while maintaining enough strength to raise the maximum expected load. Since the field-mountable winch assembly 30 may be moved by workers and placed on the crossbeam 23 of the utility pole assembly 17, weight is a concern. Each component may be evaluated separately and may be made of different lightweight material that can perform the necessary function. For example, the clamp assembly 45, which may be supporting all the components of the field-mountable winch assembly 30, may be made of steel while the boom roller 34, which only supports the load, may be made of aluminum.

Some components of the field-mountable winch assembly and the aerial device 10 may be made of a material that aids in electrical insulation. For example, the controller housing 54 or the boom assembly 14 may be made of a polymer or composite and the controls 56 and the controller housing 54 may use special separation to separate the workers from any electrical equipment or any conductive equipment.

It should be appreciated that, while the above disclosure has been generally directed to the field of aerial devices, embodiments of the invention may be directed to other fields and uses. For example, embodiments of the invention may be used in stationary cranes, antennas, digger derricks, and other equipment. The field-mountable winch assembly 30 may be used to raise and lower transformer 15, insulator 21, three phase power lines, or any other device or tool that may be used on the pole assembly 17. Similarly, the field-mountable winch assembly 30 may be used to attach to a tree branch, pole, rod, truck, car, or any vehicle that may support the load and used to tow a vehicle, pull tree stumps, raise lumber, or any other utilization that a field-mountable winch assembly 30 may be used for.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A field-mountable winch assembly, comprising:
a boom;
a boom roller configured to attach to the boom;
a boom mount configured to support the boom;
wherein the boom roller is configured to support a line;
a drum configured to rotate and wrap the line;
a motor configured to rotate the drum;
a base for supporting at least the boom mount and the motor;
a support drum configured to support the base; and
a clamp comprising an upper clamp portion and a lower clamp portion,
wherein the support drum is mounted directly to and supported by the upper clamp portion,
wherein the clamp is configured to clamp to a utility pole crossbeam,
wherein the upper clamp portion and the lower clamp portion are configured to be directly connected and tightened together to secure the utility pole crossbeam between the upper clamp portion and the lower clamp portion by friction,
wherein the support drum actuates the base to rotate the boom such that the line may be disposed to a side of the utility pole crossbeam.

2. The assembly of claim 1, wherein the field-mountable winch assembly is configured to be operable by a user in a utility platform assembly while the field-mountable winch assembly is mounted on the utility pole crossbeam.

3. The assembly of claim 1, further comprising a piston configured to act on the boom mount rotating the boom mount in a vertical direction about an axis transverse to the boom.

4. The assembly of claim 1, wherein the support drum is configured to rotate the base about a vertical axis.

5. The assembly of claim 1, wherein the clamp is configured to the shape of the utility pole crossbeam to increase the in-contact surface area between the clamp and the utility pole crossbeam.

6. The assembly of claim 5, wherein the upper clamp portion and the lower clamp portion are attached with bolts and comprise a material or texture on at least one surface to reduce slippage between the clamp and the utility pole crossbeam.

7. The assembly of claim 3, wherein the piston, the support drum, and the boom are powered by an external power source.

8. A field-mountable winch assembly, comprising:
a boom;
a boom mount configured to support the boom;
a boom roller configured to attach to the boom;
a mount roller configured to attach to the boom mount,
wherein the boom roller and mount roller are configured to support a line;
a drum configured to rotate and wrap the line;
a motor configured to rotate the drum;
a base configured to support at least the boom mount and the motor;
a support drum configured to support the base; and
a clamp assembly comprising an upper clamp portion and a lower clamp portion;
wherein the clamp assembly is configured to support the support drum,
wherein the clamp assembly is configured to clamp to a utility pole crossbeam,
wherein the upper clamp portion and the lower clamp portion are configured to be directly connected and tightened together to secure the utility pole crossbeam between the upper clamp portion and the lower clamp portion by friction,
wherein the support drum actuates the base to rotate the boom such that the line may be disposed to a side of the utility pole crossbeam,
wherein the support drum is mounted directly to and supported by the upper clamp portion.

9. The assembly of claim 8, wherein the field-mountable winch assembly is configured to be operable by a user in a utility platform assembly while the field-mountable winch assembly is mounted on the utility pole crossbeam.

10. The assembly of claim 8,
wherein the boom comprises an inner boom and an outer boom,
wherein the inner boom is at least partially disposed within the outer boom and telescopically extends and retracts.

11. The assembly of claim 8, wherein the clamp assembly comprises a material on at least one surface that, when in contact with the utility pole crossbeam, reduces the likelihood of slippage as compared to the clamp assembly without the material.

12. The assembly of claim 11, wherein the material is a polymer.

13. The assembly of claim 8, wherein the support drum rotates about a vertical axis.

14. The assembly of claim 8, wherein the upper clamp portion and the lower clamp portion are configured to clamp onto the utility pole crossbeam using bolts.

15. A field-mountable winch assembly, comprising:
- a boom;
- a boom mount configured to support the boom;
- a boom roller configured to attach to the boom;
- wherein the boom roller is configured to support a line;
- a drum configured to rotate and wrap the line;
- a motor configured to rotate the drum;
- a base configured to support at least the boom mount and the motor;
- a support drum configured to support the base; and
- a clamp comprising an upper clamp portion and a lower clamp portion configured to attach directly to and support the support drum,
- wherein the upper clamp portion and the lower clamp portion are configured to be directly connected and tightened together to secure a utility pole crossbeam between the upper clamp portion and the lower clamp portion by friction,
- wherein the support drum actuates the base to rotate the boom such that the line may be disposed to a side of a utility pole crossbeam.

16. The assembly of claim 15, further comprising a piston configured to act on the boom mount rotating the boom mount in a vertical direction about an axis transverse to the boom.

17. The assembly of claim 15, wherein the clamp assembly comprises a texture on at least one surface that, when in contact with the utility pole crossbeam, reduces the likelihood of slippage as compared to the clamp without the texture.

18. The assembly of claim 17, wherein the texture is at least one of grooves, craters, or protrusions.

19. The assembly of claim 15,
- wherein the boom comprises an inner boom and an outer boom,
- wherein the inner boom is at least partially disposed within the outer boom and telescopically extends and retracts.

20. The assembly of claim 15, further comprising a mount roller configured to support the line and attached to the boom mount.

* * * * *